United States Patent [19]
McInnes et al.

[11] 3,874,898
[45] Apr. 1, 1975

[54] DRYING PROCESS AND RESULTANT PRODUCT

[75] Inventors: Alan Don McInnes, Wollstonecraft; Robert John Bolton, West Pymble, both of New South Wales, Australia

[73] Assignee: A. C. Hatrick Chemicals Pty. Limited, Botany, New South Wales, Australia

[22] Filed: June 19, 1972

[21] Appl. No.: 264,191

[52] U.S. Cl................ 117/62, 117/12, 117/15, 117/38, 117/62.2, 117/119.6
[51] Int. Cl............................................. B44d 1/44
[58] Field of Search.......... 117/62, 62.2, 119.6, 15, 117/38, 12, ; 260/2.5 BD, 75 NE, 77.5 AA, 77.5 A

[56] References Cited
UNITED STATES PATENTS

| | | | |
|---|---|---|---|
| 2,439,108 | 4/1948 | Stachle | 117/62.2 |
| 2,455,936 | 12/1948 | Lowe | 117/62.2 X |
| 2,652,345 | 9/1953 | Jones | 117/62.2 |
| 2,657,151 | 10/1953 | Gensel et al. | 117/62.2 X |
| 2,973,285 | 2/1961 | Berke et al. | 117/62.2 X |
| 3,085,897 | 4/1963 | Priest et al. | 117/62.2 X |
| 3,100,159 | 8/1963 | Ullman | 117/62.2 |
| 3,318,722 | 5/1967 | Ullman | 117/62 |

*Primary Examiner*—Michael R. Lusignan
*Attorney, Agent, or Firm*—Hyman F. Glass; Emory L. Groff, Jr.

[57] ABSTRACT

Process for rapidly forming a dried coating upon a suitable substrate. Process comprises coating a non-aqueous vehicle consisting essentially of at least one polyisocyanate prepolymer on the substrate and treating the vehicle with a vapor agent consisting essentially of ammonia, monofunctional amine or polyfunctional amine.

11 Claims, 1 Drawing Figure

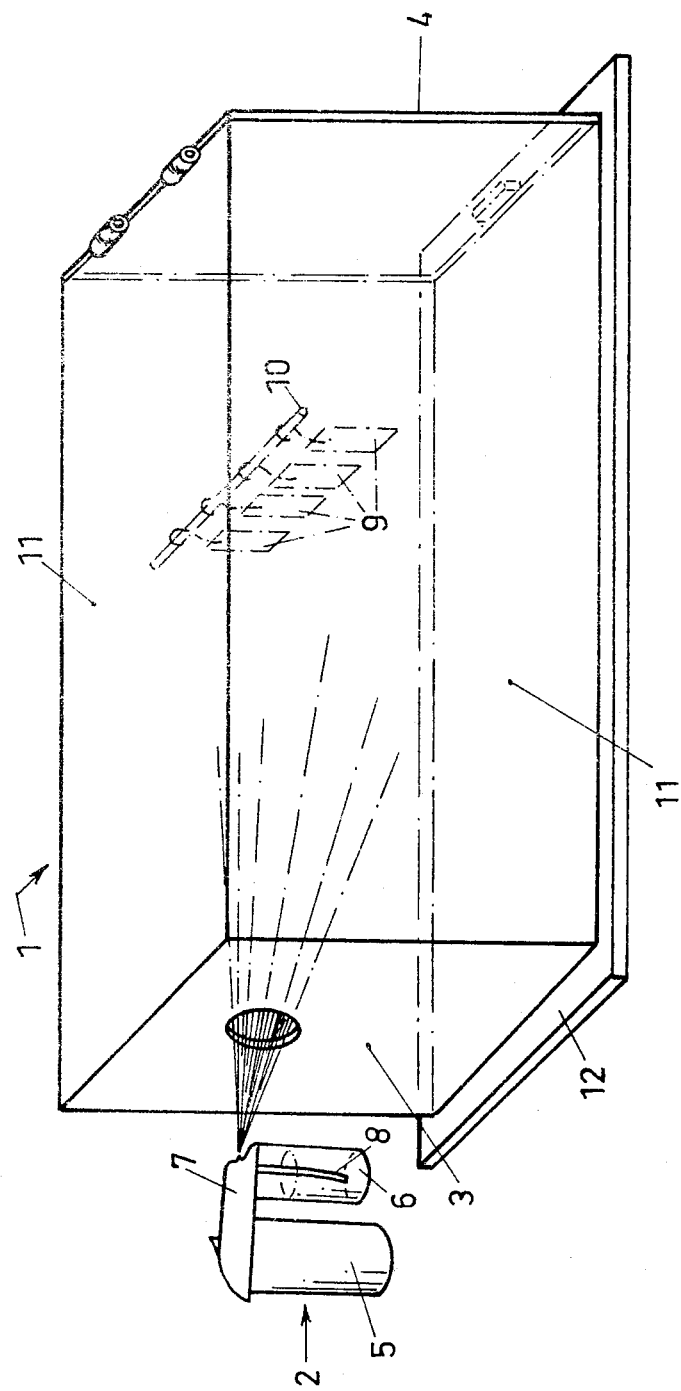

DRYING PROCESS AND RESULTANT PRODUCT

This invention relates to an improved process for effecting the rapid drying of pre-polymers of polyisocyanates. By the invention, there is provided a process, and a resultant product, whereby such operation is performed far more speedily than, and just as effectively as, heretofore.

Pre-polymers possessing residual isocyanate groups and formed for example by reaction between polyisocyanates and hydroxyl or carboxylic group containing compounds are known—such compounds (a) having been used as (inter alia) surface coatings, adhesives, and caulking compounds, and (b) being incorporated in certain printing inks and vehicles therefor (such incorporation, in fact, constitutes the characteristic feature of a prior art invention (now assigned to Applicants) in respect of paste printing inks, and vehicles, for employment in letter press, lithographic and lithographic metal printing processes and machines). In so far as these particular groupings ((a) and (b)), are concerned, the background of (i.e. the prior art leading up to) the present invention was as follows:

i. Drying of the surface coatings et al was usually effected at room temperature, either (a) by physical mixture in the liquid phase with a compound containing active hydrogen atoms and capable of cross-linking reaction with an isocyanate (such as a hydroxy or carboxylic compound), or (b) by non-oxidative reaction with atmospheric moisture. However, while not completely unsatisfactory, neither technique is particularly fast. For instance, in the non-oxidative moisture drying of a film of surface coating pre-polymer, the time taken to reach a dry state (as defined hereafter) usually ranges from about one hour (under conditions of high humidity) to more than ten hours (under conditions of low humidity). Attempts have been made to reduce this time by the employment of catalysts. However, there is a limit to the reduction in drying time that can be achieved by a catalyst at any given atmospheric humidity—in addition to which the employment of a catalyst brings with it attendant disadvantages such as the need for (sometimes impractical) pre-mixing and a marked diminution in can stability.

ii. In discussing printing vehicles and inks (in this specification, the expression inks is to be understood as inclusive of varnishes), it should be of assistance—in ensuring that the picture presented is clear and comprehensive—to briefly discuss the principal classes of inks and the drying mechanisms presently used in relation thereto. Thus printing inks fall into several groups, the most important being:

1. Paste printing inks suitable for letterpress and offset litho printing processes.
2. Screen printing inks suitable for silk screen type printing.
3. Liquid printing inks suitable for gravure and flexographic printing processes.

The first group, employing printing inks of high viscosity, are usually distributed on the roller systems of the letterpress and offset lithographic presses to an extremely thin film before application to a substrate—and therefore liquids of low volatility are also employed to avoid tack build-up which would interfere with printing efficiency. The drying mechanism is usually oxidation (of the drying components of the ink) under ambient conditions - although in some cases, simple absorbtion into the porous paper or paperboard is sufficient to allow handling. In other cases (such as lithographic metal decoration) the oxidation process is accelerated by the application of elevated temperatures—whilst in high speed "heat set" printing on continuous webs of paper, ovens are used to dry the ink film by removal of the ink solvent(s).

The second group is closely related to the first—however, because operational requirements are not so exacting in silk-screen printing, screen printing inks can contain volatile solvents. These inks, having been forced through a screen to give the print, dry largely by evaporation.

The third group invariably comprises low viscosity printing inks which largely depend upon evaporation of volatile solvents for their initial, if not ultimate, drying phase (although they may also employ ancillary mechanisms for complete hardening). Inks of this type are useful on gravure and flexographic printing presses where the overall design of the press depends upon the basic facts of low viscosity and solvent volatility. The liquidity of this class of inks enables them to be readily circulated—or in other words, the operational distribution of such inks can, in practice, be readily controlled. The volatility of the solvents employed allows rapid drying of the film under ambient or contrived temperature conditions.

While all the aforementioned drying systems have been employed in the past with reasonable success, each, nevertheless, displays certain disadvantages. To elaborate:

i. In the first group—paste inks suitable for letterpress and offset lithographic presses—there are several problems. Thus, employing ambient temperatures, letterpress or offset lithographic ink films take several hours to dry oxidatively—in addition to which there is an ever-present danger of newly printed sheets "settingoff" one to the other as they are automatically stacked in the delivery of the press. To minimise the great losses associated with this last mentioned danger, each sheet may be sprayed with an anti-setoff material which helps separate the sheets; however this material is otherwise deleterious to the operation as a whole. In lithographic metal decoration, an attempt has been made to meet the problems of oxidative drying by passing the sheets (of metal) to be dried through an oven, for some ten to twenty minutes, at temperatures characteristically around 350° F. However, such ovens are not only extremely expensive to purchase initially (being some five to six times as expensive as the actual printing press) but their running costs are extremely high. Finally, in "heat set" printing, the paste ink depends for its "drying" on passing the just-printed web of paper through ovens which drive off the ink solvent(s) to yield a print which can be folded, cut, etc., as it comes off the machine. However, once again, the ovens are expensive to purchase and expensive to heat—as well as creating a pollution problem of some magnitude.

ii. In the second group—screen printing inks-drying (as previously stated) is mainly achieved by evaporation. However—as with the paste inks—this is a slow process.

iii. In the third group—liquid printing inks suitable for gravure and flexographic printing presses—removal of the solvents employed is achieved by evaporation. However this, again, is a slow operation—in addition to which the incompletely dried film may stick or "setoff" during post-printing operations. If more volatile solvents are employed, problems may arise in the actual printing—and often hot air or other contrived drying procedures are employed to hasten the drying. In any event undesirably large amounts of solvents are driven off into the general atmosphere so that, apart from the pollution produced thereby, explosion and fire are additional and specific hazards.

In so far as paste printing inks and vehicles are concerned, many of the problems discussed heretofore have been met by the abovementioned (now assigned to Applicants) earlier invention - and therefore, in certain forms thereof, this present invention could be regarded as a further development of such earlier invention. However, as will be evident from the following description, the ramifications of the present invention go far beyond the purview of paste printing inks and their vehicles.

The invention is predicated upon our discovery that, when a pre-polymer containing free isocyanate groups is subjected to treatment with ammonia or an amine in vapor phase, such pre-polymer is dried at a rate which is dramatically faster than anything accomplished heretofore; for instance, we have found that pre-polymer films or coatings can be dried in accordance with the invention at rates, which are 50-2,000 times faster than that achieved according to prior art practice, and which in most cases (and for all practical purposes) must be measured in seconds. It will be readily appreciated that, compared with what is known, this represents a substantial step forward, bringing with it concomitant advantages which will be immediately apparent to, and understood by, those skilled in the art.

In its broadest aspect, the invention provides a process for drying a vehicle including a pre-polymer containing free isocyanate groups which comprises subjecting the vehicle to treatment with an agent consisting essentially of ammonia or an amine, the said agent being in vapor phase. In one form of the invention, the vehicle may be a paste printing vehicle or ink; in other forms of the invention, the vehicle is a liquid printing ink or a screen printing ink; in still other (illustrative) forms of the invention, the vehicle may be an adhesive, surface coating or caulking compound.

In the foregoing broad definition (and as used hereafter), the following are to be understood:

The term vehicle, when unqualified (as in the said foregoing definition) is intended to be generic to the various free-isocyanate group containing printing inks, printing ink vehicles, surface coatings, liquid adhesives et al.

The term printing ink is not confined to fully formulated compositions—which compositions principally comprise printing vehicle, pigment(s) (usually in finely divided form) and conventional solvent(s), wax(es) and flow out agent(s). Thus (and in particular), it also includes within its ambit pigment-free compositions.

In respect of a film, coating or the like which is to be, or has been, subjected to the process of the invention (the expressions film and coating, if used interchangeably hereafter, are to be understood as, for the purpose of the invention, synonymous), the term "drying" is to be understood as (i) including within its ambit "curing" and as (ii) indicating that the film is either free from "tack", insoluble in solvent, possessed of an advanced degree of film integrity, or able to with-stand reasonable abrasion or pressure without damage. It will also be appreciated that, in some circumstances, a dry film may evidence all of the foregoing qualities.

The expression free isocyanate groups includes within its ambit potentially free such groups. The meaning to be conveyed is that the pre-polymer has isocyanate groups which are releasable, or available, for reaction.

Pursuant to the preceding paragraph, compounds containing free isocyanate groups are to be understood as embracing all such compounds. Accordingly, comprehended thereby are, not only isocyanates with urethane structure and polyisocyanates, but also those with polyisocyanurate, biuret, and allophanate structure.

Treatment of the vehicle with ammonia or the selected amine is subject to no particular environmental criteria - and therefore, any location not unsuitable for the purpose (i.e. not deleterious to ammonia-isocyanate or amine-isocyanate reaction) may be utilised. Preferably however, such treatment is carried out in an enclosed space.

The expression vapor-phase denotes that the ammonia or amine is in gaseous, vapor, or any other entrained air-borne form (e.g. dispersion, fog or aerosol) in which it is available for reaction.

"Amine" is to be understood as conveying its ordinary meaning - and hence it includes within its ambit not only those of simple primary aliphatic monofunctional structure, but also amines characterised by (i) polyfunctionality and (ii) a more advanced degree of hydrogen substitution. Typical examples of the abovementioned (preferred) class are mono compounds such as methylamine, ethylamine, propylamine, isopropylamine and the numerous isomers of butylamine—while representative of poly functional amines are hydrazine, ethylene diamine, propylene diamine and diethylene triamine. Further supportive examples (as will be seen hereafter) are diethylamine and triethylamine.

The expression "substrate" is to be construed in the widest possible sense, our investigations having indicated that any surface to which the vehicle can be adheringly applied—and upon which it will be retained while treatment with the agent is effected—is within the purview of the invention. Thus, in the printing embodiments of the invention, the substrate may be of appropriate porous or non-porous material, these categories in turn being respectively exemplified by paper board and metal foil; in other embodiments, it is contemplated that the substrate could be of, for example, steel plate, concrete or compatible plastics material. Property-wise the foregoing substrates have little in common—which fact is supportive of the wide construction called for above.

The invention will now be described with reference to several examples—which examples, for convenience of consideration, are grouped in two series designated as A and B. In the first series, the tests—in as much as they did not aim to record such factors as the precise amount of agent employed—could be generally described as qualitative in character. In series B however, all parameters were noted—accordingly, extremely precise and accurate data was obtained.

It will be understood that the following examples are merely illustrative of the invention—and are not to be construed in any limiting sense.

SERIES A

EXAMPLE 1

A paste printing ink vehicle having the following composition:

| | |
|---|---|
| isophthalic modified pentaerythritol ester of rosin | 24.00 |
| diisobutyl phthalate (solvent) | 24.00 |
| aliphatic hydrocarbon oil (B/R approximately 300° to 350°C) | 8.00 |
| diphenylmethane-4,4'-diisocyanate (homologues) | 44.00 |
| | 100.00% | was printed at a film weight approximating letterpress-offset lithographic film weights on the following substrates:
1. a coated art paper
2. a coated paperboard
3. metal foil Each of these prints was immediately placed in a sealed 2 litre glass vessel containing ammonia vapor. Thereafter, a further set of prints was similarly prepared, the individual members in this case being placed in respective 2 litre glass vessel containing monoethylamine vapor. After periods of between 10 and 30 seconds all films had hardened to a commercially useful degree.

EXAMPLE 2

A paste printing ink having the following composition:

| | |
|---|---|
| A chip material containing 70% benzidine yellow pigment and 30% inert hydrocarbon resin | 32.00 |
| diisobutyl phthalate (solvent) | 15.00 |
| vehicle as example (1) | 45.00 |
| aliphatic mineral oil as example (1) | 8.00 |
| | 100.00% | was printed at film weights approximating letterpress/-offset lithographic film weights on the following substrates:
1. a coated art paper
2. a coated paper board
3. metal foil As in Example 1, the prints were immediately placed in sealed 2 litre glass vessels containing
a. ammonia vapor
b. monoethylamine vapor After periods of between 10 and 30 seconds, all films had hardened to a commercially useful degree.

EXAMPLE 3

In this example a pre-polymer type vehicle based on tolylene diisocyanate at 40 percent solids in xylene and containing 2.2 percent free NCO groups was employed. This vehicle was applied with a Meyer bar to give a film weight approximating that usually employed in gravure, and flexographic, printing processes on the following substrates:
1. a coated art paper
2. a coated paperboard
3. metal foil After solvent evaporation for 15 minutes, the coated specimens were (as in Example 1) respectively placed in sealed 2 litre glass vessels containing
a. ammonia vapor
b. monoethylamine vapor After periods of between 10 and 30 seconds the films had hardened to a commercially useful degree.

EXAMPLE 4

A film of an unpigmented prepolymer, based on a poly hydroxy compound and tolylene diisocyanate at 40 percent solids in xylene and containing approximately 2.2 percent NCO groups, was applied to a pair of steel panels by dip coating. The first panel was allowed to dry under normal atmospheric conditions of 18°C and 70 percent relative humidity. The second panel was coated, allowed to stand in air for 15 minutes to permit some of the xylene to evaporate, and then placed in a sealed 2 litre glass vessel in which 2 ml of concentrated ammonia had been placed 1 hour previously.

After 30 seconds the second panel was removed and found to be tack free (i.e. dry). The first panel drying in air was tack free after 1 hour and 40 minutes.

EXAMPLE 5

A panel was prepared as in Example 4. After 15 minutes it was placed in a sealed 2 litre glass vessel in which 1 gram of hydrazine dihydrochloride (as source of hydrazine) and 5 ml of 30 percent sodium hydroxide solution had been placed previously. After 4 minutes the panel was examined and found to be tack free.

EXAMPLE 6

A film of an unpigmented aliphatic urethane prepolymer (40 percent solids in xylene) formed by reaction of isophorone diisocyanate with a polyhydroxy compound, was prepared and a steel panel was coated therewith. The tack free drying time in air at 18°C and 70 percent relative humidity was found to be 4 hours. A further similarly coated panel, after 15 minutes in air to allow evaporation of some of the solvent, was placed in a sealed 2 litre glass vessel with ammonia vapor for 2 minutes. The panel film had a slight tack and was then exposed to the ammonia vapor for a further 2 minutes, 4 minutes in all. At this stage the film was tack free.

EXAMPLE 7

A panel film was prepared as in Example 6, and allowed to dry for 15 minutes in air. The panel was then placed in a sealed 2 litre glass vessel in which 2 ml of ethylene diamine had been placed 1 hour previously. After 4 minutes the panel was removed and the film was found to be tack free.

SERIES B

In this series, 28 additional tests were performed — and the results thereof are set out in tabular form hereafter (Table Y). To enable the tests (and the results obtained therefrom) to be fully understood, complete details re materials utilised, and the modus operandi employed, will now be given. Again it is reiterated that the details are merely illustrative of the invention.

Vehicles

The following free isocyanate group containing pre polymers were employed:

A. A paste printing ink similar (in components and proportions thereof) to the ink of foregoing Example 2—but, in lieu of benzidine yellow, based on phthalocyanine blue pigment chip.

B. An over-print varnish based on an aliphatic polyisocyanate prepolymer. This vehicle is similar (in components and proportions) to that of the foregoing Example 1 except that, in lieu of diphenylmethane-4,4'-diisocyanate, it is based on the biuret of hexamethylene diisocyanate.

C. The vehicle employed in Examples 3, 4 and 5.

D. The vehicle employed in Examples 6 and 7.

In Table Y, the vehicles are simply identified as above (i.e. by the respective letters A–D).

Substrates

Metal foil and paper or paper board (as in Series A above) are satisfactory. Specifically, two substrates were employed; viz.

1. Aluminum foil: smooth sided, 4 mil.
2. A paper board known as Dutch Buff System Board: weight 110 lbs/500 sheets; sheet size 25½ inches×30½inches; uncoated.

Drying Agents (to be vaporised):

1. Ammonia (S.G. 0.88).
2. Monoethylamine (70 percent solution in water).
3. Ethylene diamine (99 percent).
4. Diethylamine (99.4 percent).
5. Triethylamine (100 percent).

Testing Procedure: General

The vehicle was initially worked (if desirable or necessary) on a glass plate (e.g. by means of a metal transfer roller) until a thin film of satisfactory viscosity was obtained—following which, per medium of a lightly engraved metal roller uniformly coated with the vehicle, one pass was made over the substrate. Samples of the coated substrate were then cut and transferred to a curing or drying chamber (hereafter, simply called the drying chamber).

The drying agent (vaporised) was injected into one end of the chamber for predetermined periods of time (as elaborated upon hereafter), the selected periods being measured by a stop-watch. The injection means was constituted by an atomising apparatus, the output of which had been calibrated as a function of time.

Immediately after the timed introduction of the drying agent, a further timing operation (again by stopwatch) was commenced, and the coated substrates were removed from the drying chamber after preselected intervals. Following withdrawal, each substrate was laid upon a flat surface, labelled, and tested for drying—which determination, in one appropriate embodiment thereof, was carried out by a technique based upon the ability of the vehicle to transfer from a substrate to a further (hereafter called a transfer) substrate when these are brought together under load. In this embodiment, the transfer substrate, desirably an absorbent paper, was laid on top of, and at right angles to, the coated side of the primary substrate—and thereafter, a disc-shaped weight was rolled along the length of the transfer substrate for a fixed (short) period.

The transfer substrate became coated with the vehicle to a degree dependent upon the state of drying of the ink on the first-mentioned substrate. Thus, when fully dried, there was no transfer.

Note: With pigmented inks, the transfer substrate shows visual evidence of the degree of drying. In unpigmented compositions it was desirable (to achieve the same visual end) to dip the transfer substrate into micronised carbon black pigment immediately following the transfer step, the excess carbon black being removed by an air jet.

Testing Procedure: Specific a. In the case of vehicles A and B, the preliminary working (on a glass plate) was carried out as above, a uniform film of vehicle being transferred to the substrate material, to give a coverage approximating to that representative of printing ink film weight, by the lightly engraved metal roller. Each sweep of the roller produced a coated area approximately 4 inches×3½ inches which—with a substrate being typically 3 inches×1 inch in dimensions—is comfortably sufficient for two tests. After coating and cutting, the individual substrates were immediately transferred to the drying chamber.

b. For vehicles C and D, the preliminary working was eliminated — and instead, such vehicles were simply (and, in these instances, more satisfactorily) brush-applied to the substrate material to a wet film thickness (representative of surface coatings) of approximately 0.1 mm. After coating and cutting, these substrates were permitted to stand for 15 minutes (for purposes of solvent elimination)—following which such samples were transferred to the drying chamber.

c. FIG. 1 of the accompanying drawings (in association with which the immediately following description should be considered) depicts the preferred apparatus for carrying out this series of tests. Thus, the drying chamber 1 is rectangularly configured, the dimensions (in centimetres) being 43 (length)×20 (height)×30 (width)—giving an internal volume of 25,800 c.c. the significance of which will become apparent in paragraph (d) immediately hereafter. The atomising apparatus 2 is situated near the end 3 of the chamber opposite the entry door 4, such atomising apparatus being constituted by a first (aerosol propellant) container 5 and a second (drying agent) container 6, the output of the first container being directed through a nozzle 7 situated above the upper end of a tube 8 immersed in the liquid held in container 6. The apparatus 2 is constructed so as to be capable of aspirating the liquid into the curing chamber at 70 psi; translated into practice, this means that 10 ccs of liquid can be discharged in a period of 12 seconds. The individual substrates 9 are suspended from a transversely disposed cross rail 10, the ends of which are fixed in opposite sides 11 of the chamber. The chamber conveniently rests upon, and is supported by, a base 12. The sides and ends of the chamber are transparent, the material known as perspex being eminently suitable.

d. Six predetermined periods of time (for injection of the drying agent into the chamber) were selected, the individual durations being at 1, 2, 3, 4 and 5 seconds—and with the liquid being dischargeable at the rate indicated in the immediately preceding paragraph (c), these periods respectively corresponded to discharge volumes of 0.83 cc, 1.66 cc, 2.50 cc, 3.34 cc, 4.17 cc and 8.34 cc. Given a chamber volume of 25,800 cc (calculated as above), and on the basis of complete volatilization of agent (which, prima facie, took place), these periods of injection produced, in the drying chamber, the respective concentrations of drying agent (expressed in parts per million) set out in the following Table (X).

Table X

| Injection Time (Secs) | Concentration (P.P.M.) |
| --- | --- |
| 1 | 32.2 |
| 2 | 64.4 |
| 3 | 97.0 |
| 4 | 129.0 |
| 5 | 161.5 |
| 10 | 323.5 |

Note: It will be observed that these concentrations have been expressed to the first decimal point. However, as results of this order would not be realistic in Table Y hereafter, the relevant (ppm) figures listed therein are given to the nearest appropriate multiple of 5. For example, where the determined drying time is equated with an injection time of say 5 seconds, the relevant ppm concentration is indicated as 160 (instead of 161.5).

e. The pre-selected intervals (following which the coated substrate samples—after subjection to the drying agent as above described—were withdrawn from the drying chamber) were primarily established as 5, 10, 20 and 30 seconds—and secondarily established as (if necessary) 40, 50 and 60 seconds. Each vehicle (A-D) was analysed upon the two mentioned substrates, at the above specified 6 ppm concentrations, for these intervals, the pattern being to progressively test a substrate at the lowest ppm concentration for up to 30 seconds, then (if necessary) at the next highest concentration for up to 30 seconds—and so on. After removal from the chamber, each substrate sample was tested for dryness in the manner most appropriate thereto. Thus i. vehicle A was tested per medium of the "transfer substrate—employing" technique described above, the juxtaposed substrates being subjected to pressure for 2 seconds, from a 1 kg disc-shaped weight of diameter 4½ inches and width ½ inch.

ii. Fundamentally, vehicle B was treated similarly to vehicle A. However, in this instance, use was also made of the abovementioned supportive technique involving the employment upon the further substrate of micronised carbon black pigment.

iii. Because of a combination of factors—viz. relatively thick film, together with fairly rapid (as it turned out) drying times—vehicles C and D were tested subjectively, on the original substrates, using a finger test.

f. In light of the foregoing, it is believed that the results set out in (now to be presented) Table Y are substantially self-explanatory. However, the following riders may assist the interpretation thereof.

i. The results indicate the minimum times and concentrations to achieve a dry state. To illustrate, for the test of a vehicle B—board-monoethylamine combination, these results emerge:
  A. If no agent is employed the vehicle-coated board will be found to be undried after 10,000 seconds (2½-3 hours).
  B. For injection times of 1-3 seconds, the vehicle-coated board was still undried after 30 seconds. For an injection time of 4 seconds (130 ppm), drying was effected in 30 seconds.
  C. For an injection time of 5 seconds (160 ppm), drying was effected in 5-10 seconds. This being so, there was no point in testing this particular combination any further.

ii. It will be noted that, for vehicles C-D, joint "foil-board" figures are presented (giving 22 sets of results—instead of the 28 that may have been expected from the foregoing remarks re 28 tests). The explanation is that, while all the tests were in fact carried out, the results obtained for foil and board were substantially the same.

iii. For diethylamine and triethylamine only vehicle A-board and vehicle A-foil were tested.

iv. The figures given re vehicle A—aluminum foil—monoethylamine, and vehicle B—ammonia (for both substrates) should be viewed in the overall perspective of the invention—and against the background of what was known before. Thus, compared with the prior art where the drying operation occupied periods invariably measured in hours, failure to completely dry in one minute is not significant.

TABLE Y

| Vehicle | Substrate | TACK FREE DRYING TIME : CONCENTRATION FOR EACH AGENT | | | | |
| --- | --- | --- | --- | --- | --- | --- |
| | | Ammonia | Ethylene Diamine | Monoethylamine | Diethylamine | Triethylamine |
| A | Board | Nil-10,000 secs<br>160 ppm-20 secs<br>100 ppm-30 secs | Nil-10,000 secs<br>65 ppm- 5 secs<br>30 ppm-40 secs | Nil-10,000 secs<br>160 ppm-50 secs | Nil-10,000 secs<br>160 ppm-30 secs | Nil-10,000 secs<br>160 ppm-30 secs |
| A | Aluminum Foil | Nil-20,000 secs<br>160 ppm-40 secs | Nil-20,000 secs<br>100 ppm- 5 secs | Nil-20,000 secs<br>325 ppm->60 secs | Nil-20,000 secs<br>160 ppm-60 secs | Nil-20,000 secs<br>160 ppm-60 secs |
| B | Board | Nil-10,000 secs<br>325 ppm->60 secs | Nil-10,000 secs<br>30 ppm-30 secs<br>65 ppm-10 secs | Nil-10,000 secs<br>130 ppm-30 secs<br>160ppm-5/10 secs | | |
| B | Aluminum Foil | Nil->>$10^5$ secs<br>325 ppm->60 secs | Nil->>$10^5$ secs<br>65 ppm-20 secs<br>100 ppm- 5 secs | Nil->>$10^5$ secs<br>160 ppm-20 secs | | |
| C | Foil/Board | Nil- 2,400 secs<br>65 ppm- 5 secs | Nil- 2,400 secs<br>30 ppm- 5 secs | Nil 2,400 secs<br>160 ppm-20 secs | | |
| D | Foil/Board | Nil- 2,400 secs<br>65 ppm- 5 secs | Nil- 2,400 secs<br>30 ppm- 5 secs | Nil- 2,400 secs<br>130 ppm-20 secs | | |

In closing it is reiterated that, generally speaking, the foregoing is intended to be merely illustrative of the invention, the essence of which is set out in the broad definition heretofore and the principal claim hereafter. As long as such essence is observed, details falling therewithin may be varied in accordance with situational requirements.

What is claimed is:

1. A process for rapidly forming a dried coating upon a suitable substrate comprising (1) coating a vehicle consisting essentially of at least one polyisocyanate prepolymer and at least one organic solvent upon said substrate and (2) subjecting said vehicle to treatment with an agent consisting essentially of ammonia, monofunctional amine or polyfunctional amine, said agent being in vapor form.

2. The process of claim 1 wherein the agent is ammonia.

3. The process of claim 1 wherein the agent is a primary monofunctional aliphatic amine or a primary difunctional aliphatic amine.

4. The process of claim 1 wherein the agent is initially in liquid form and is atomized so as to produce the requisite vapor phase.

5. The process of claim 1 wherein said vehicle is (1) a paste printing vehicle or (2) a paste printing ink incorporating said printing vehicle.

6. The process of claim 1 wherein said vehicle is (1) a liquid printing ink or (2) a screen printing ink.

7. The process of claim 1 wherein said vehicle is (1) a liquid adhesive, (2) a surface coating or (3) a caulking compound.

8. The process of claim 1 wherein said substrate is of a material suitable for printing thereon.

9. The process of claim 8 wherein said vehicle is (1) a paste printing ink, (2) a liquid printing ink or (3) a screen printing ink.

10. The process of claim 1 wherein said substrate is of a material suitable for coating thereon and said vehicle is unpigmented.

11. A process for rapidly forming a dried coating upon a suitable substrate comprising (1) coating a nonaqueous vehicle consisting essentially of at least one polyisocyanate prepolymer upon said substrate and (2) subjecting said vehicle to treatment with an agent consisting essentially of ammonia, monofunctional amine or polyfunctional amine, said agent being in vapor form.

* * * * *

UNITED STATES PATENT OFFICE
CERTIFICATE OF CORRECTION

Patent No. 3,874,898         Dated April 1, 1975

Inventor(s) Alan Don McInnes and Robert John Bolton

It is certified that error appears in the above-identified patent and that said Letters Patent are hereby corrected as shown below:

In column 1, after "[21] Appl. No. 264,191" there should be inserted

--- [30] Foreign Application Priority Data
        June 21, 1971    Australia........PA 5252
        June 21, 1971    Australia........PA 5253 ---

Signed and sealed this 20th day of May 1975.

(SEAL)
Attest:

RUTH C. MASON
Attesting Officer

C. MARSHALL DANN
Commissioner of Patents
and Trademarks